July 1, 1952  B. STORSAND  2,602,152

ONE PHASE PUSH-PULL CIRCUIT FOR RECTIFIERS

Filed March 4, 1948

Inventor
Bjarne Storsand
by Singer, Ehlert, Stern & Carlberg
Attorneys

Patented July 1, 1952

2,602,152

UNITED STATES PATENT OFFICE 2,602,152

ONE PHASE PUSH-PULL CIRCUIT FOR RECTIFIERS

Bjarne Storsand, Zurich, Switzerland, assignor to Maschinenfabrik Oerlikon, Zurich-Oerlikon, Switzerland, a Swiss firm Application March 4, 1948, Serial No. 12,927
In Switzerland March 19, 1947

2 Claims. (Cl. 321—26)

The invention relates to improvements in the operation and control of mercury vapor rectifiers.

Figure 1:
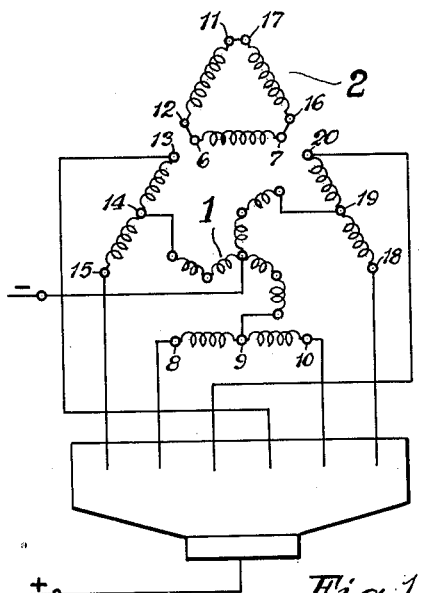
Fig. 1 illustrates diagrammatically a push-pull circuit of a rectifier system of the present invention.
Figure 2:
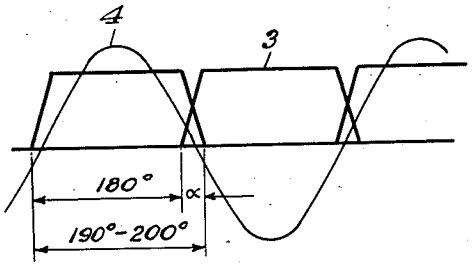
Fig. 2 shows a graph illustrating the anode current curve and anode voltage curve.

In mercury-vapour rectifiers having so-called polyphase push-pull circuit the three-phase absorption reactance coil 1, and transformer 2 as shown in Fig. 1 of the accompanying diagrammatic drawings, are known. Such absorption reactance coils are also known under the terms "three-core phase equaliser" and "interphase transformer" but the first named term will be used here. In this way a high loading of the rectifier in conjunction with small arc losses can be attained. The anode current curve 3 and the anode voltage curve 4 are shown in Fig. 2 of the drawing. In this case the conducting period of the anodes amounts to 180 electrical degrees, together with the commutating angle, which normally amount to 10–20°. As a rule the transformer primary is connected in delta; with star connection such transformers are provided with a tertiary winding which carries a third harmonic equalizing current.

In accordance with the invention the transformer primary is connected in star, and each phase is provided with a free magnetic shunt, in order that the conduction periods of the individual anodes may amount to more than 180° and that a higher loading capacity of the rectifiers is thus obtained.

Figure 3:
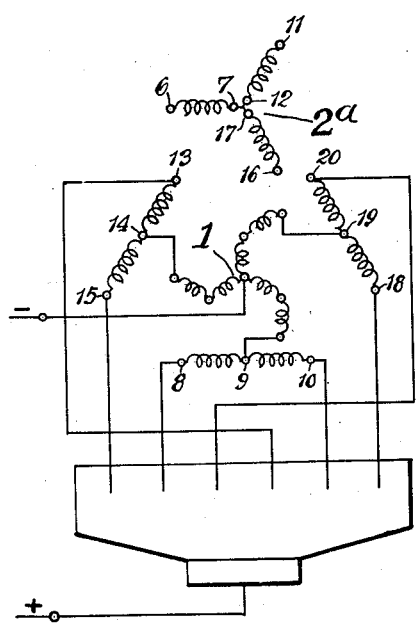
Fig. 3 illustrates diagrammatically another circuit arrangement of a rectifier system of the invention.
Figure 4:
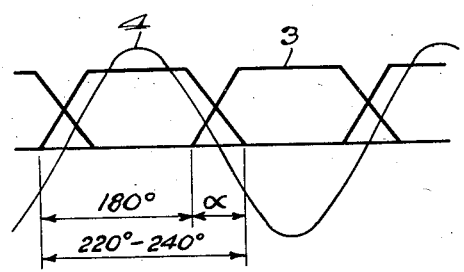
Fig. 4 shows a graph illustrating the anode current curve and the anode voltage curve of the embodiment illustrated in Fig. 3.

Fig. 3 and 4 of the accompanying drawings relate to one example of execution of the object of the invention.

Since the transformer primary 2a is connected in star, the loading current of the anodes is compelled to flow for about 220–240°, it then takes the shape shown in Fig. 4. Thus always four of six anodes are carrying current. In consequence of the reduction of the factor $di/dt$ at the moment of extinction the current curve according to Fig. 4 allows of a considerably higher rectifier loading than the arrangement in Fig. 1.

Figure 5:
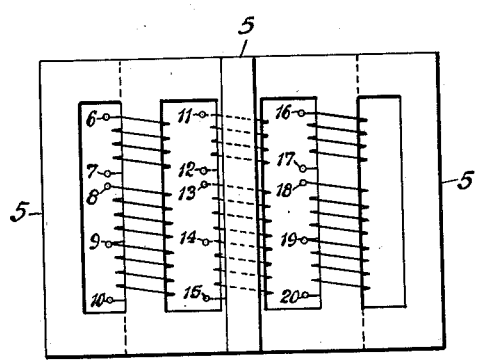
Fig. 5 illustrates diagrammatically an elevation view of the transformer employed in the circuit arrangement of the present invention.

The free magnetic shunt, which is necessary for this arrangement in conjunction with the three core absorption reactance coil, can be effected either by arranging stray paths 5 from yoke to yoke in polyphase transformers, as shown in Fig. 5, or by adopting several single-phase transformers with their primary windings connected in star.

The ends of three phase windings of the transformer primary are provided with connecting terminal 6, 7; 11, 12 and 16, 17. The secondary windings are provided with connecting terminals 8, 9, 10; 13, 14, 15 and 18, 19, 20. 9, 14 and 15 are the tap connectors at the centers of the secondary windings.

In Fig. 5, the distribution of the transformer windings on the three legs of the transformer is diagrammatically illustrated and the numbers 6 to 12 indicate the above mentioned connecting terminals of the various windings.

Because of the lower loading the arrangement according to the invention allows heavy-current rectifiers to be constructed which have a lower arc loss than with normal connections and is therefore economical especially for lower voltages. Thus heavy-current rectifiers may be constructed which have an efficiency of over 90% with voltages of 200 volts.

What I claim is:

1. In a rectifier system of the character described: a transformer; a three-phase primary winding in said transformer connected in star; three secondary windings associated with said primary winding; six anodes, one for each terminal of said three windings; means conductively connecting said anodes with the respective terminals of said secondary windings; a three-phase absorption reactance coil connected in star and means connecting the free ends of each phase winding of said reactance coil to the center point of a respective secondary winding; a transformer core for said three-phase primary winding and said three secondary windings; and a magnetic shunt for each phase of said transformer, whereby the conduction period of each anode is increased to more than 180°.

2. In a rectifier system of the type described, a transformer having a three phase primary winding and three secondary windings, a three-core absorption reactance coil, said three phase primary winding being connected in star, a three-phase current supply, means connecting said primary winding to said supply, a negative terminal, means connecting each of the coils of said reactance coil at one end to said negative terminal and at the other end to the center point of each of said secondary windings, six anodes, means connecting each anode to one end of each of said secondary windings, a positive terminal, and a cathode connected to said positive terminal, said transformer having a three legged core with yokes connecting the legs and having free magnetic shunts from yoke to yoke, whereby the current loading period of the individual anodes amounts to 220° to 240° and thus allows high loading of the rectifier.

BJARNE STORSAND.

REFERENCES CITED

The following references are of record in the file of this patent:

UNITED STATES PATENTS

| Number | Name | Date |
|---|---|---|
| 2,022,341 | Meyer-Delius | Nov. 26, 1935 |
| 2,039,034 | Rose et al. | Apr. 28, 1936 |
| 2,128,055 | Rose | Aug. 23, 1938 |
| 2,195,296 | Christensen | Mar. 26, 1940 |
| 2,231,604 | Stebbins | Feb. 11, 1941 |
| 2,307,527 | Maslin et al. | Jan. 5, 1943 |